(12) United States Patent
Karst

(10) Patent No.: US 11,702,129 B2
(45) Date of Patent: Jul. 18, 2023

(54) HYDRAULIC SYSTEM FOR WORK MACHINE WITH STEERABLE REAR WHEELS

(71) Applicant: DEERE & COMPANY, Moline, IL (US)

(72) Inventor: Austin J. Karst, Bloomfield, IA (US)

(73) Assignee: Deere & Company, Moline, IL (US)

( * ) Notice: Subject to any disclaimer, the term of this patent is extended or adjusted under 35 U.S.C. 154(b) by 185 days.

(21) Appl. No.: 17/202,478

(22) Filed: Mar. 16, 2021

(65) Prior Publication Data

US 2022/0297749 A1 Sep. 22, 2022

(51) Int. Cl.
*B62D 5/20* (2006.01)
*B62D 5/06* (2006.01)

(52) U.S. Cl.
CPC .............. *B62D 5/20* (2013.01); *B62D 5/062* (2013.01)

(58) Field of Classification Search
CPC .................................. B62D 5/20; B62D 5/062

USPC ......................................................... 180/403
See application file for complete search history.

(56) References Cited

U.S. PATENT DOCUMENTS 5,816,359 A * 10/1998 Gregorio ................. B62D 5/08
180/441

* cited by examiner

*Primary Examiner* — Minnah L Seoh
*Assistant Examiner* — Felicia L. Brittman

(57) ABSTRACT

A hydraulic system for controlling a pair of steerable caster wheels includes a left side actuator and a right side actuator. A rear steering control valve is moveable between a first state for disabling direct control of the left and side actuators and a second state for enabling direct control the left and right side actuators to provide a steer response. A fluid connection continuously connects the pressure source and the fluidic tie rod fluid circuit in fluid communication when the rear steering control valve is disposed in one of the first state and the second state to continuously supply the pressurized fluid to the fluidic tie rod fluid circuit.

14 Claims, 6 Drawing Sheets

HYDRAULIC SYSTEM FOR WORK MACHINE WITH STEERABLE REAR WHEELS

TECHNICAL FIELD

The disclosure generally relates to a hydraulic system for an agricultural machine having steerable caster wheels.

BACKGROUND

Some agricultural machines, such as but not limited to self-propelled windrowers, are driven by a dual-path hydrostatic system. Speed changes are made by adjusting the speed of both front drive wheels simultaneously. Primary steering or direction changes are made by adjusting the relative speed of the front drive wheels. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped with a steering system for controlling the rear caster wheels. For example, the vehicle may be equipped with a hydraulic system that actuates hydraulic cylinders to control the position of the rear caster wheels relative to their respective vertical axis about which they rotate. In order to maintain the versatility of the rear steering system of such vehicles, the rear caster wheels should be capable of rotating independently of each other in certain circumstances, such as for example, when reversing directions and/or in response to a significant lateral force.

When switching the caster wheels from a non-controlled steering state to an actively controlled steering state, pressure within the hydraulic system may spike to undesirable high levels. Additionally, in some configurations and/or in some situations, fluid pressure within the hydraulic system may bleed away causing the caster wheels to flutter during some driving situations.

SUMMARY

A hydraulic system for controlling a pair of steerable caster wheels of an agricultural machine is provided. The hydraulic system includes a pressure source that is operable to circulate a pressurized fluid. The hydraulic system further includes a left side actuator that is configured to control a left caster wheel, and a right side actuator that is configured to control a right caster wheel. A rear steering control valve is moveable between a first state and a second state. When positioned in the first state, the rear steering control valve disables direct control of the left side actuator and the right side actuator. When positioned in the second state, the rear steering control valve enables direct control the left side actuator and the right side actuator to provide a steer response. A left side steering fluid circuit is in fluid communication with the left side actuator, and a right side steering fluid circuit is in fluid communication with the right side actuator. A fluidic tie rod fluid circuit interconnects both the left side actuator and the right side actuator in fluid communication with the rear steering control valve. A fluid connection continuously connects the pressure source and the fluidic tie rod fluid circuit in fluid communication when the rear steering control valve is disposed in one of the first state and the second state to continuously supply the pressurized fluid to the fluidic tie rod fluid circuit.

In one aspect of the disclosure, the fluid connection continuously connects the pressure source and the fluidic tie rod fluid circuit in fluid communication when the rear steering control valve is disposed in either the first state or the second state to continuously supply the pressurized fluid to the fluidic tie rod fluid circuit.

In one aspect of the disclosure, the fluid connection includes a flow restriction to restrict the fluid supply to the fluidic tie rod fluid circuit. In one implementation, the flow restriction may include, but is not limited to, a reduced orifice restriction.

In one implementation, the fluid connection is external of the rear steering control valve. In an alternative implementation, the rear steering control valve includes the fluid connection, i.e., the fluid connection is integrally formed into the rear steering control valve.

In one aspect of the disclosure, the first state of the rear steering control valve connects fluid communication between the fluidic tie rod fluid circuit and a tank return fluid circuit, and disconnects fluid communication between a supply pressure fluid circuit and a command valve supply fluid circuit. The second state of the rear steering control valve disconnects fluid communication between the fluidic tie rod fluid circuit and the tank return fluid circuit, and connects fluid communication between the supply pressure fluid circuit and the command valve supply fluid circuit. In one implementation, the fluid connection connects fluid communication between the fluidic tie rod fluid circuit and the supply pressure fluid circuit when the rear steering control valve is positioned in the first state. In another implementation, the fluid connection connects fluid communication between the fluidic tie rod fluid circuit and the supply pressure fluid circuit when the rear steering control valve is positioned in the second state. In yet another implementation, the fluid connection connects fluid communication between the fluidic tie rod fluid circuit and the supply pressure fluid circuit when the rear steering control valve is positioned in either the first state and/or the second state.

Accordingly, the hydraulic system provided herein includes the fluid connection that directly connects the pressure source and the fluidic tie rod fluid circuit. By so doing, pressurized fluid from the pressure source may be introduced into the fluidic tie rod fluid circuit regardless of how the left side actuator and the right side actuator are controlled. The fluid connection may be implemented when the rear steering control valve is disposed in either the first state and/or the second state. When the fluid connection is implemented with the rear steering control valve disposed in the first state, the flow restriction in the fluid connection may delay the pressure source from deadheading, thereby allowing steering control valves to shift to avoid or reduce pressure spikes in the hydraulic system. When the fluid connection is implemented with the rear steering control valve disposed in the second state, the flow restriction in the fluid connection may maintain fluid pressure within the fluidic tie rod fluid circuit at the stand-by pressure of the pressure source, e.g., around 300 psi. The flow restriction may be sized to filter out load spikes to prevent or unintended movement of the left and right caster wheels, while maintaining a minimum fluid pressure within the fluidic tie rod fluid circuit.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
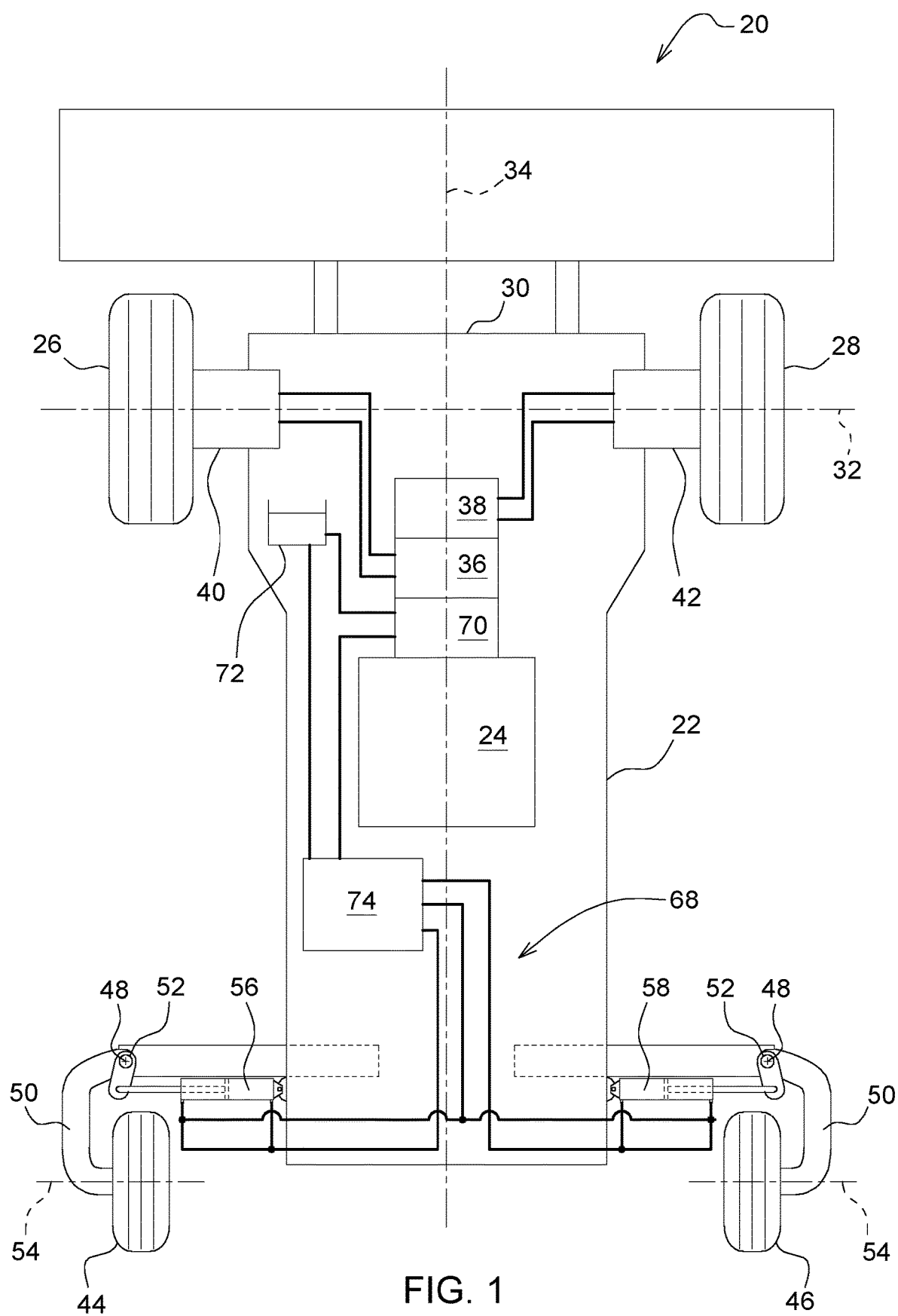
FIG. 1 is a schematic plan view of an agricultural machine.

Referring to the Figures, wherein like numerals indicate like parts throughout the several views, an agricultural machine is generally shown at 20 in FIG. 1. The example implementation of the agricultural machine 20 shown in FIG. 1 includes, but is not limited to, a self-propelled windrower. However, it should be appreciated that the teachings of this disclosure may be applied to machines other than the example windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Figure 2:
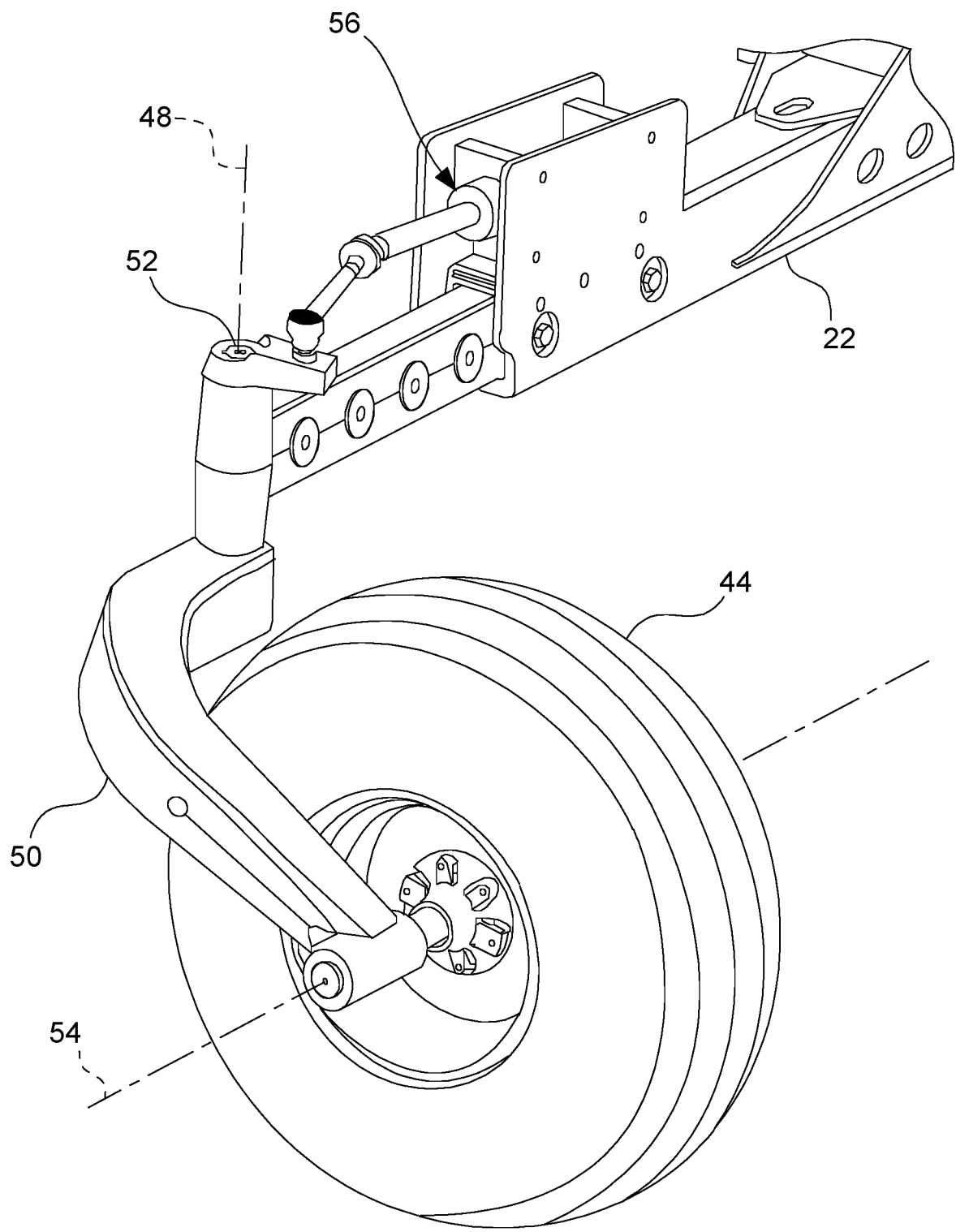
FIG. 2 is a schematic perspective view of a rear caster wheel of the agricultural machine.

Referring to FIGS. 1 and 2, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48. The left rear caster wheel 44 and the right rear caster wheel 46 may be attached to the frame 22 in a suitable manner. For example, as shown in FIG. 2, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example implementation shown in FIG. 1 and described herein, each of the right side actuator 58 and the left side actuator 56 include a double acting hydraulic cylinder. As such, the right side actuator 58 includes an inboard fluid port 60 and an outboard fluid port 62 for receiving and/or discharging hydraulic fluid. Similarly, the left side actuator 56 includes an inboard fluid port 64 and an outboard fluid port 66 for receiving and/or discharging hydraulic fluid.

The agricultural machine 20 includes a hydraulic system 68 for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be de-coupled to provide independent operation. Additionally, the hydraulic system 68 allows hydraulic forces applied to the left side actuator 56 and the right side actuator 58 to be overcome or overridden by forces applied to the left rear caster wheel 44 and the right rear caster wheel 46 by the ground.

The hydraulic system 68 includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system 68, stores the fluid, and supplies the fluid to the pressure source 70, e.g., an auxiliary fluid pump shown in FIG. 1.

Figure 3:
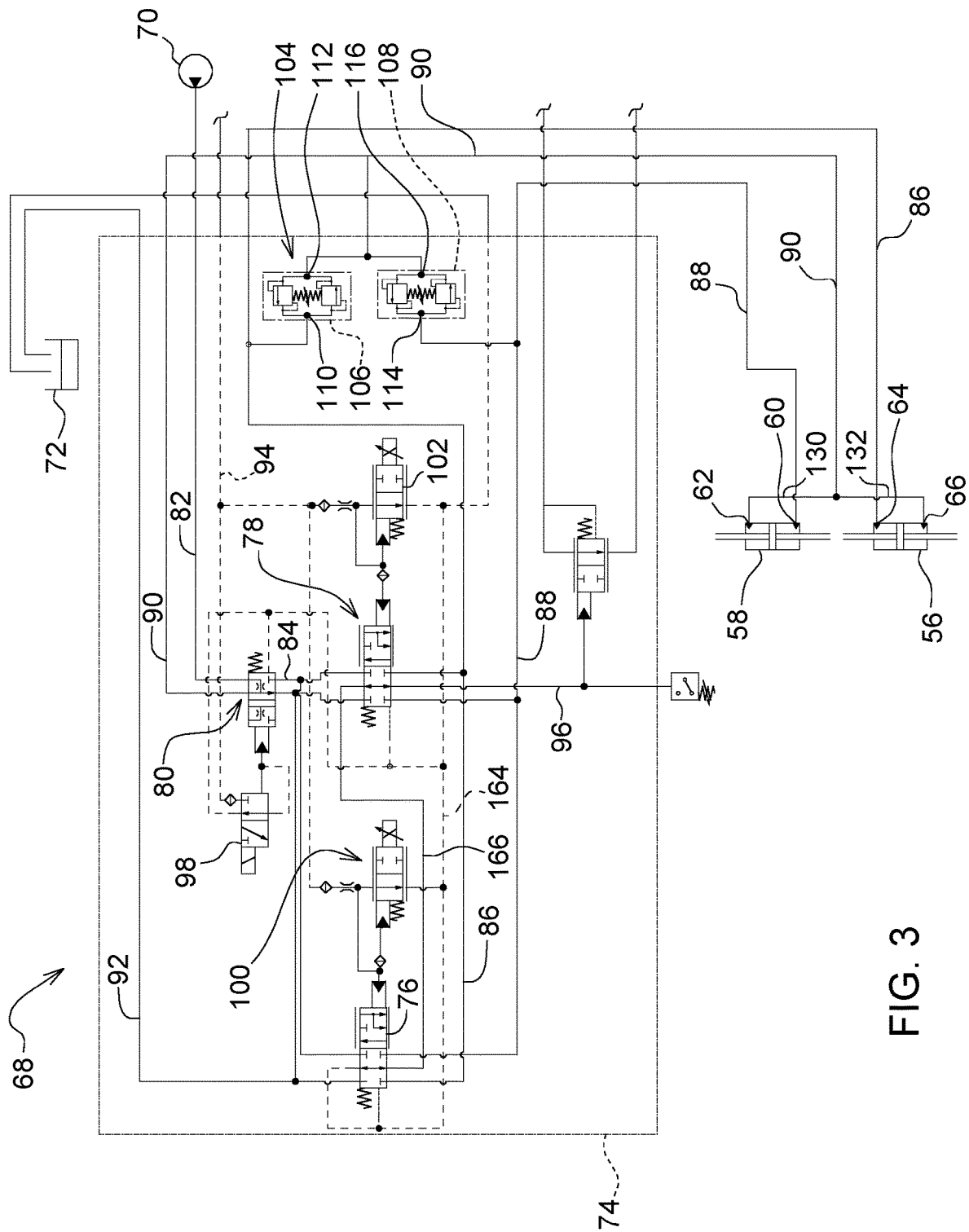
FIG. 3 is a schematic layout of a hydraulic system of the agricultural machine.

Referring to FIG. 3, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A cross-valve fluid circuit 166 interconnects the left steering command valve 76 and the right steering command valve 78 in fluid communication. A pilot supply fluid circuit 94 is disposed in fluid communication with the left steering command valve 76, the right steering command valve 78, and the rear steering control valve 80. A pilot return fluid circuit 164 is disposed in fluid communication with the left steering command valve 76, the right steering command valve 78, the rear steering control valve 80, and the tank 72. A pressure sensor fluid circuit 96 is disposed in fluid communication with the right steering command valve 78.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to and/or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example implementation shown in FIG. 3, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example implementation depicted in FIG. 3 and described herein.

As shown in the example implementation of FIG. 3, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 164 and the cross-valve fluid circuit 166, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 164, and connect fluid communication between the command valve supply fluid circuit 84 with both the right side steering fluid circuit 88 and the cross-valve fluid circuit 166. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example implementation shown in FIG. 3, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example implementation depicted in FIG. 3 and described herein.

As shown in the example implementation of FIG. 3, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 166 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 166, and connect fluid communication between the command valve supply fluid circuit 84 and both the left side steering fluid circuit 86 and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example implementation shown in FIG. 3, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example implementation depicted in FIG. 3 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example implementation of FIG. 3, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 3, the left side pressure relief valve 106 and the right side pressure relief valve 108 are disposed in the valve block 74. However, in other implementations, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from the first ports 110, 114 to the second ports 112, 116 respectively or from the second ports 112, 116 to the first ports 110, 114 respectively, the left side pressure relief valve 106 and the right side pressure relief valve 108 are configured to allow fluid communication when the applied fluid pressure is greater than a defined limit.

The left side steering fluid circuit 86 is in fluid communication with the inboard fluid port 64 of the left side actuator 56. A left side line 132 is connected to the outboard fluid port 66 of the left side actuator 56. The right side steering fluid circuit 88 is in fluid communication with the inboard fluid port 60 of the right side actuator 58. A right side line 130 is connected to the outboard fluid port 62 of the right side actuator 58. The right side line 130 and the left side line 132 are connected in fluid communication to the fluidic tie rod fluid circuit 90.

With the rear steering control valve 80 disposed in its first state, and the left steering command valve 76 and the right steering command valve 78 are disposed in their respective second states, the supply pressure fluid circuit 82 is disconnected from the command valve supply fluid circuit 84, such that no active steering controls may be applied to the left side actuator 56 and the right side actuator 58. Additionally, with the fluidic tie rod fluid circuit 90 and the tank return fluid circuit 92 connected in fluid communication, any fluid pressure in the fluidic tie rod fluid circuit 90 is free to dump to the tank 72. As such, the left rear caster wheel 44 and the right rear caster wheel 46 are free to rotate about their respective vertical axes 48 independent of each other, thereby allowing the agricultural machine 20 to execute a true spin turn around a fixed point. When disposed in this configuration, the left rear caster wheel 44 and the right rear caster wheel 46 do not provide substantial steering input, i.e., passive control.

With the rear steering control valve 80 disposed in its first state, each of the left steering command valve 76 and right steering command valve 78 may be controlled to one or more positions between the first state and the second state of the left steering command valve 76 and the right steering command valve 78 respectively. This provides semi-passive proportional control of the left rear caster wheel 44 and the right rear caster wheel 46 respectively. In the example embodiment described above, the left steering command valve 76 and the right steering command valve 78 are normally disposed in their respective first state. As such, the left steering command valve 76 and the right steering command valve 78 may be controlled into a position between their respective first state and second state by applying a variable activation signal to the left steering command valve 76 and the right steering command valve 78 respectively.

The rear steering control valve 80 may be controlled into its second state. As described above, when the rear steering control valve 80 is disposed in its second state, the rear steering control valve 80 disconnects fluid communication between the fluidic tie rod fluid circuit 90 and the tank return fluid circuit 92 and connects fluid communication between the supply pressure fluid circuit 82 and the command valve supply fluid circuit 84 to provide active control of the left rear caster wheel 44 and the right rear caster wheel 46. In the example embodiment described above, the rear steering control valve 80 is normally disposed in its first state. As such, the rear steering control valve 80 may be controlled into its second state by applying an activation signal to the rear steering control valve 80.

Once the rear steering control valve 80 is disposed in its second state, each of the left steering command valve 76 and right steering command valve 78 may be controlled into variable positions between their respective first state and second state to provide active control of the left rear caster wheel 44 and the right rear caster wheel 46 respectively. In the example embodiment described above, the left steering command valve 76 and the right steering command valve 78 are normally disposed in their respective first state. As such, the left steering command valve 76 and the right steering command valve 78 may be controlled into a position between their respective first state and second state by applying a variable activation signal to the left steering command valve 76 and the right steering command valve 78 respectively.

As described above, the hydraulic system 68 includes the fluidic tie rod fluid circuit 90 that interconnect both the left side actuator 56 and the right side actuator 58 with the rear steering control valve 80 in fluid communication. The fluidic tie rod fluid circuit 90 forms a fluid tie rod that interconnects the left side actuator 56 and the right side actuator 58. The fluidic tie rod fluid circuit 90 connects the fluid tie rod to the rear steering control valve 80, which may be controlled to close off the fluidic tie rod fluid circuit 90, or to open the fluidic tie rod fluid circuit 90 to the tank 72.

When switching between active control and passive control of the left rear caster wheel 44 and the right rear caster wheel 46, fluid pressure within the hydraulic system 68 may spike or increase to an undesirable level. Furthermore, during operation of the agricultural machine 20, in which few steering inputs are provided during active control, such as may occur during extended straight-line driving while transporting the agricultural machine 20 on a road, some fluid pressure within the left side steering fluid circuit 86, the right side steering fluid circuit 88, and/or the fluidic tie rod fluid circuit 90, may decrease to an undesirable level allowing the left rear caster wheel 44 and/or the right rear caster wheel 46 to flutter. In order to avoid these situations, a fluid connection 150A, 150B, 150C between the fluidic tie rod fluid circuit 90 and the pressure source 70 may be included to continuously supply the fluidic tie rod fluid circuit 90 with pressurized fluid.

In one implementation, the fluid connection 150A, 150B, 150C continuously connects the pressure source 70 and the fluidic tie rod fluid circuit 90 in fluid communication when the rear steering control valve 80 is disposed in one of the first state and/or the second state to supply the pressurized fluid to the fluidic tie rod fluid circuit 90. In one implementation, the fluid connection 150A, 150B, 150C continuously connects the pressure source 70 and the fluidic tie rod fluid circuit 90 in fluid communication when the rear steering control valve 80 is disposed in either the first state or the second state to continuously supply the pressurized fluid to the fluidic tie rod fluid circuit 90. As such, the fluid connection 150A, 150B, 150C may be implemented to continuously supply fluid to the fluidic tie rod fluid circuit 90 from the pressure source 70 when the rear steering control valve 80 is disposed in only the first state, only the second state, or when disposed in either the first state or the second state.

The fluid connection 150A, 150B, 150C may include a flow restriction 152. The flow restriction 152 may include, but is not limited to, a reduced orifice restriction or some other similar device. Additionally, the flow restriction 152 may be fixed, or variable. For example, the flow restriction 152 may be electronically controllable or variable to adjust the flow rate therethrough. The flow restriction 152 restricts or limits fluid flow into the fluidic tie rod fluid circuit 90 to maintain a minimum fluid pressure within the fluidic tie rod fluid circuit 90.

Figure 4:
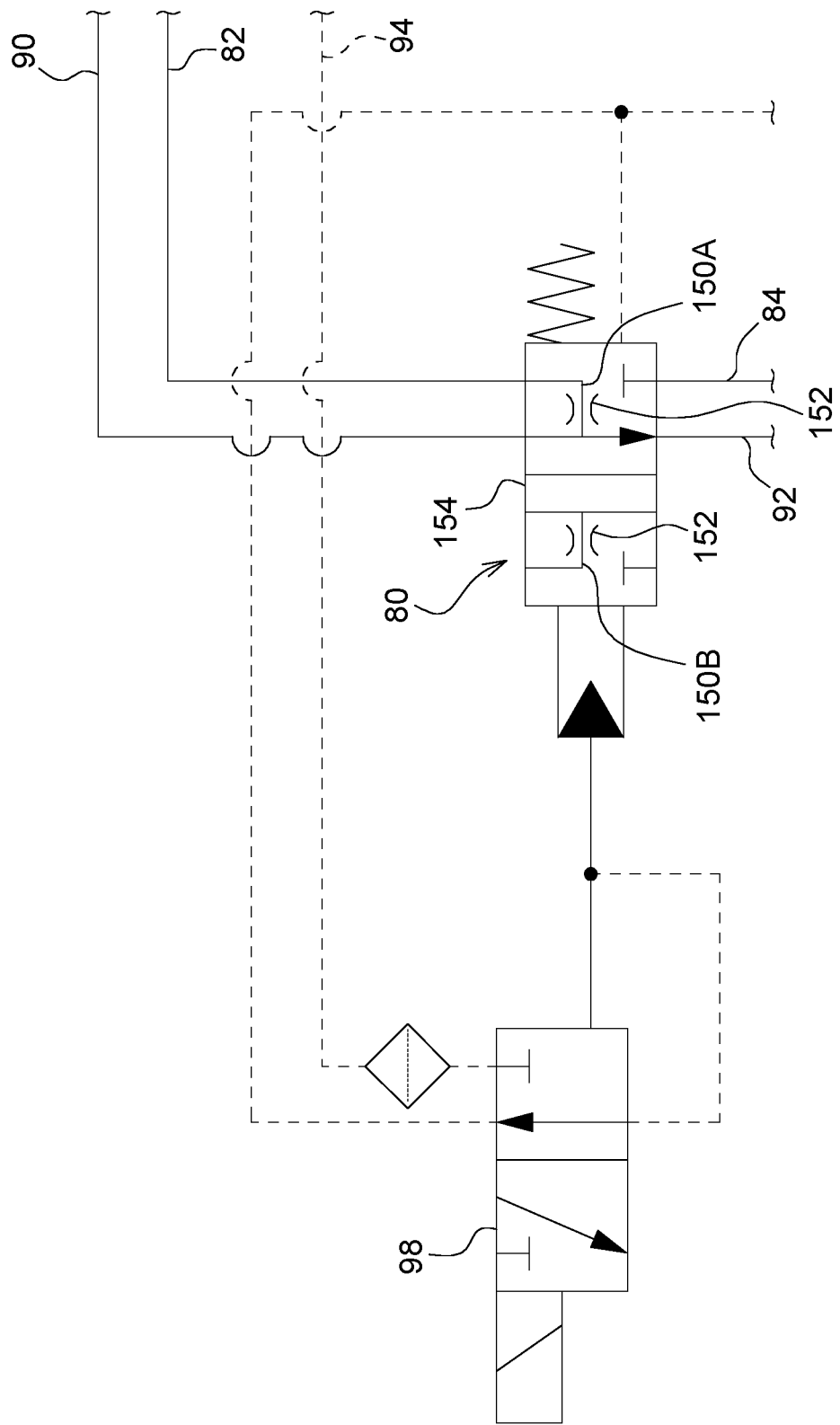
FIG. 4 is a schematic layout of a rear steering control valve of the hydraulic system.

Referring to FIG. 4, the rear steering control valve 80 is shown including the fluid connection 150A, 150B. As shown in FIG. 4 and as described above, the rear steering control valve 80 may be implemented as an on/off valve. As such, the rear steering control valve 80 may include a first fluid connection 150A arranged for use when the rear steering control valve 80 is disposed in its first state. Alternatively, or in addition to the first fluid connection 150A, the rear steering control valve 80 may include a second fluid connection 150B arranged for use when the rear steering control valve 80 is disposed in its second state.

As described above, the first state of the rear steering control valve 80 connects fluid communication between the fluidic tie rod fluid circuit 90 and the tank return fluid circuit 92, and disconnects fluid communication between the supply pressure fluid circuit 82 and the command valve supply fluid circuit 84. The first fluid connection 150A connects fluid communication between the fluidic tie rod fluid circuit 90 and the supply pressure fluid circuit 82 when the rear steering control valve 80 is positioned in the first state. The first fluid connection 150A may include the flow restriction 152 described above. The first fluid connection 150A and the flow restriction 152 may be formed into a spool 154 of the rear steering control valve 80, as is understood in the art. However, it should be appreciated that the first fluid connection 150A and the flow restriction 152 may be integrated into the rear steering control valve 80 in some other manner.

As described above, the second state of the rear steering control valve 80 disconnects fluid communication between the fluidic tie rod fluid circuit 90 and the tank return fluid circuit 92, and connects fluid communication between the supply pressure fluid circuit 82 and the command valve supply fluid circuit 84. The second fluid connection 150B connects fluid communication between the fluidic tie rod fluid circuit 90 and the supply pressure fluid circuit 82 when the rear steering control valve 80 is positioned in the second state. The second fluid connection 150B may include the flow restriction 152 described above. The second fluid connection 150B and the flow restriction 152 may be formed into the spool 154 of the rear steering control valve 80, as is understood in the art. However, it should be appreciated that the second fluid connection 150B and the flow restriction 152 may be integrated into the rear steering control valve 80 in some other manner.

Figure 5:
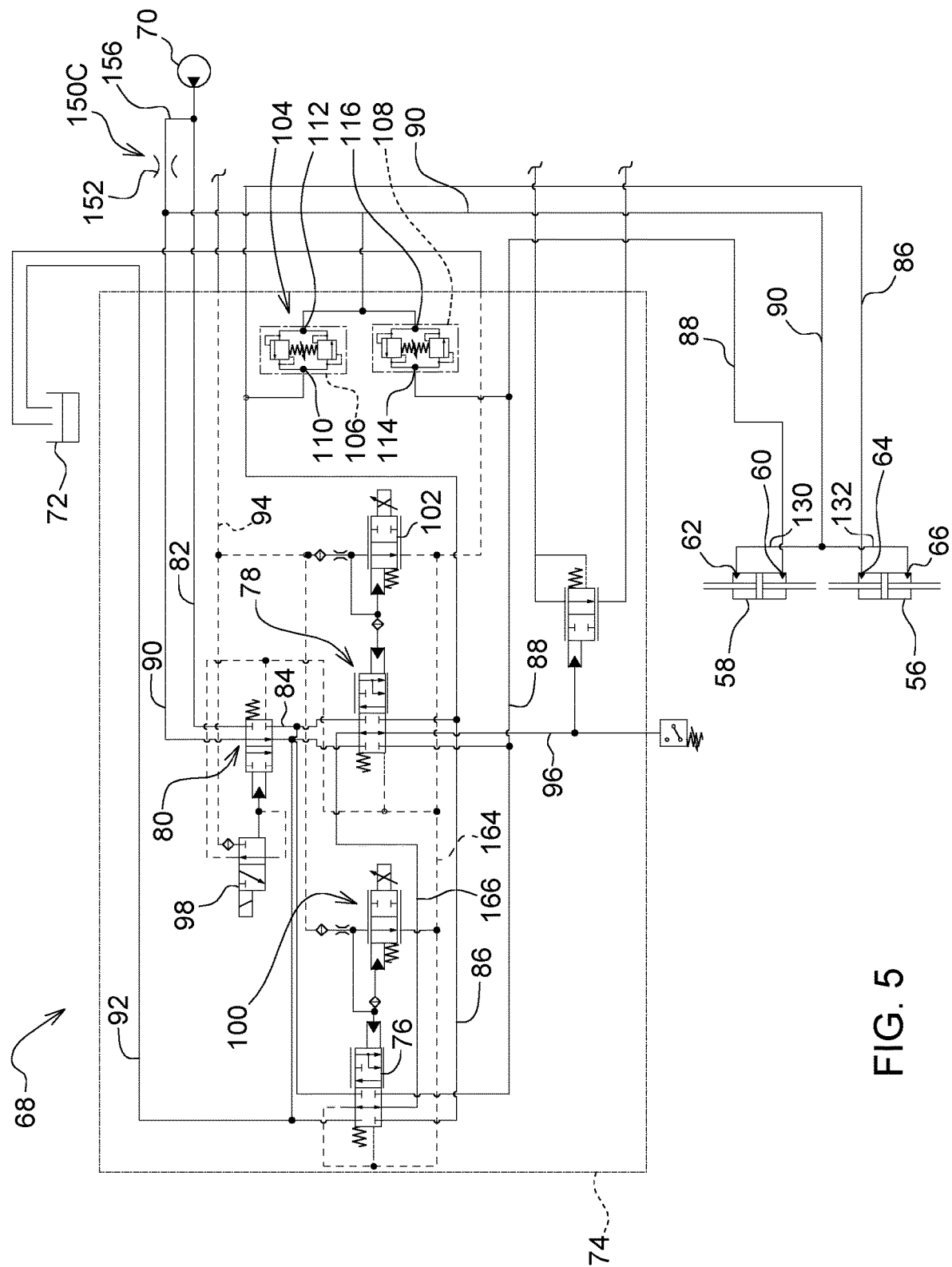
FIG. 5 is a schematic layout of a first alternative embodiment of the hydraulic system.

Referring to FIG. 5, and first alternative embodiment of the hydraulic system 68 is generally shown. The first alternative embodiment of the hydraulic system 68 includes the fluid connection 150C being located external of the rear steering control valve 80. As shown in FIG. 5, the fluid connection 150C may include a line 156 that directly connects the supply pressure fluid circuit 82 and the fluidic tie rod fluid circuit 90 in fluid communication. The line 156 may include, but is not limited to, hard lines, flexible lines, fittings, connections, fluid passages, etc. As described above, the fluid connection 150C may include the flow restriction 152.

Figure 6:
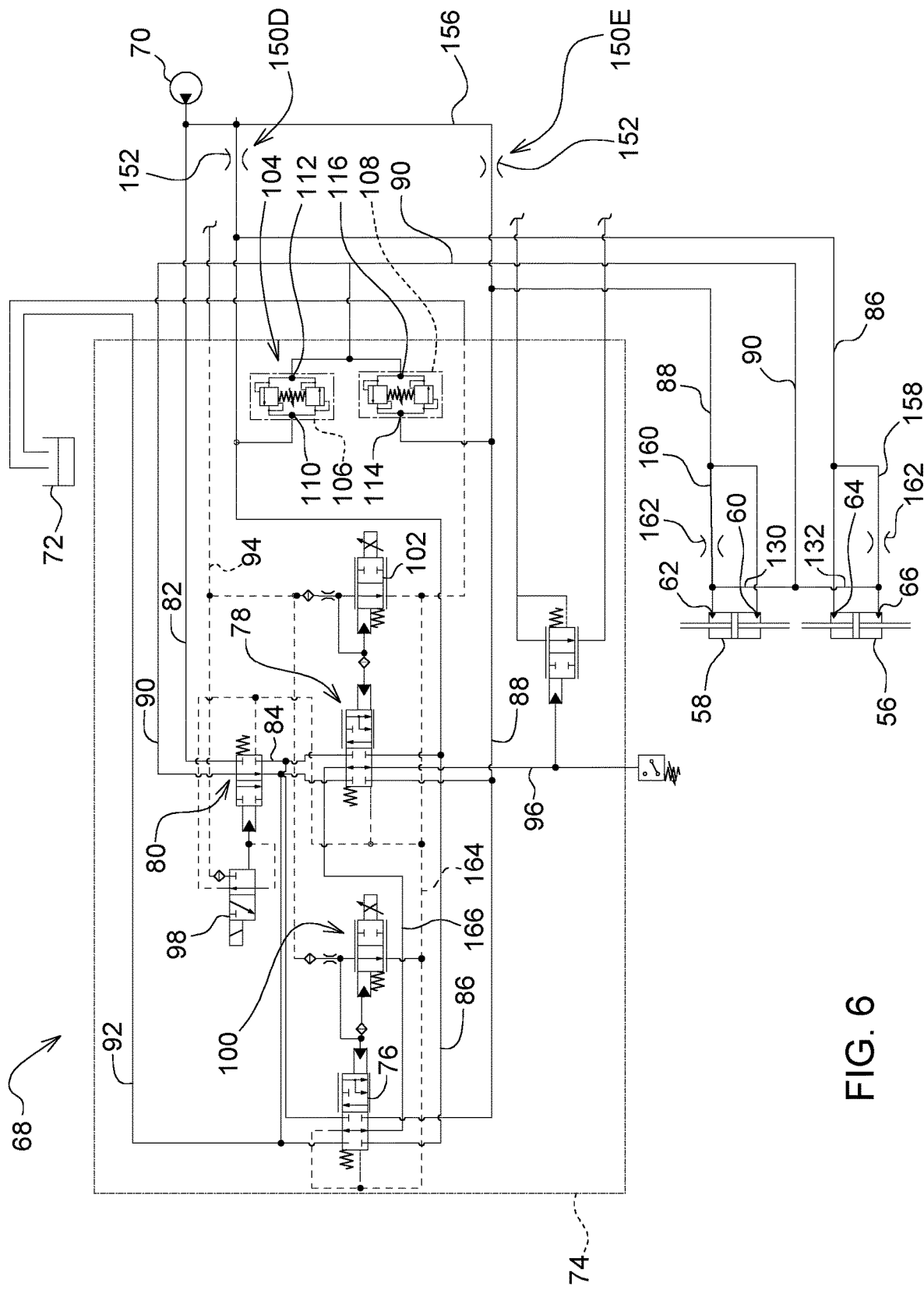
FIG. 6 is a schematic layout of a second alternative embodiment of the hydraulic system.

Referring to FIG. 6, a second alternative embodiment of the hydraulic system 68 is generally shown. The second alternative embodiment of the hydraulic system 68 includes the fluid connection 150D and/or 150E being located external of the rear steering control valve 80. The second alternative embodiment of the hydraulic system 8 may include only one of the fluid connections 150D and 150E, or may include both of the fluid connections 150D and 150E. As shown in FIG. 6, the fluid connections 150D, 150E may include one or more lines 156 that directly or indirectly connect the supply pressure fluid circuit 82 and the fluidic tie rod fluid circuit 90 in fluid communication. The line 156 may include, but is not limited to, hard lines, flexible lines, fittings, connections, fluid passages, etc.

Referring to FIG. 6, the fluid connections 150D and 150E of the second alternative embodiment of the of the hydraulic system 68 include the line 156 coupled to one or both of the left side steering fluid circuit 86 and/or the right side steering fluid circuit 88. The As described above, the fluid connections 150D and 150E may include the flow restriction 152. The fluid connections 150D, 150E of the second alternative embodiment of the hydraulic system 68 shown in FIG. 6 further include a first connecting line 158 connecting the left side steering fluid circuit 86 and the fluid tie rod fluid circuit 90, and a second connecting line 160 connecting the right side steering fluid circuit 88 and the fluid tie rod fluid circuit 90. Each of the first connecting line 158 and the second connecting line 160 may optionally include a respective flow restriction 162.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for controlling a pair of steerable caster wheels of an agricultural machine, the hydraulic system comprising:
   a pressure source operable to circulate a pressurized fluid;
   a left side actuator configured to control a left caster wheel;
   a right side actuator configured to control a right caster wheel;
   a rear steering control valve moveable between a first state disabling direct control of the left side actuator and the right side actuator, and a second state enabling direct control the left side actuator and the right side actuator to provide a steer response;
   a left side steering fluid circuit in fluid communication with the left side actuator;
   a right side steering fluid circuit in fluid communication with the right side actuator;
   a fluidic tie rod fluid circuit interconnecting both the left side actuator and the right side actuator with the rear steering control valve in fluid communication; and
   wherein the rear steering control valve includes a fluid connection, wherein the fluid connection continuously connecting the pressure source and the fluidic tie rod fluid circuit in fluid communication when the rear steering control valve is disposed in one of the first state and the second state to continuously supply the pressurized fluid to the fluidic tie rod fluid circuit.

2. The hydraulic system set forth in claim 1, wherein the fluid connection continuously connects the pressure source and the fluidic tie rod fluid circuit in fluid communication when the rear steering control valve is disposed in either the first state or the second state to continuously supply the pressurized fluid to the fluidic tie rod fluid circuit.

3. The hydraulic system set forth in claim 1, wherein the fluid connection includes a flow restriction.

4. The hydraulic system set forth in claim 3, wherein the flow restriction is a reduced orifice restriction.

5. The hydraulic system set forth in claim 1, wherein the first state of the rear steering control valve connects fluid communication between the fluidic tie rod fluid circuit and a tank return fluid circuit, and disconnects fluid communication between a supply pressure fluid circuit and a command valve supply fluid circuit, and wherein the second state of the rear steering control valve disconnects fluid communication between the fluidic tie rod fluid circuit and the tank return fluid circuit, and connects fluid communication between the supply pressure fluid circuit and the command valve supply fluid circuit.

6. The hydraulic system set forth in claim 5, wherein the fluid connection connects fluid communication between the fluidic tie rod fluid circuit and the supply pressure fluid circuit when the rear steering control valve is positioned in the first state.

7. The hydraulic system set forth in claim 5, wherein the fluid connection connects fluid communication between the fluidic tie rod fluid circuit and the supply pressure fluid circuit when the rear steering control valve is positioned in the second state.

8. An agricultural machine comprising:
a frame;
a left rear caster wheel rotatably mounted to the frame for rotational movement about a respective vertical axis;
a right rear caster wheel rotatably mounted to the frame for rotational movement about a respective vertical axis;
a hydraulic system for controlling a position of the left rear caster wheel and the right rear caster wheel, the hydraulic system including:
a pressure source operable to circulate a pressurized fluid;
a left side actuator configured to control the left rear caster wheel;
a right side actuator configured to control the right rear caster wheel;
a rear steering control valve moveable between a first state disabling direct control of the left side actuator and the right side actuator to enable the left rear caster wheel and the right rear caster wheel to rotate about their respective vertical axes independently of each other, and a second state enabling direct control the left side actuator and the right side actuator to provide a steer response from the left rear caster wheel and the right rear caster wheel;
a left side steering fluid circuit in fluid communication with the left side actuator;
a right side steering fluid circuit in fluid communication with the right side actuator;
a fluidic tie rod fluid circuit interconnecting both the left side actuator and the right side actuator with the rear steering control valve in fluid communication; and
wherein the rear steering control valve includes a fluid connection, wherein the fluid connection continuously connecting the pressure source and the fluidic tie rod fluid circuit in fluid communication when the rear steering control valve is disposed in one of the first state and the second state to continuously supply the pressurized fluid to the fluidic tie rod fluid circuit.

9. The agricultural machine set forth in claim 8, wherein the fluid connection continuously connects the pressure source and the fluidic tie rod fluid circuit in fluid communication when the rear steering control valve is disposed in either the first state or the second state to continuously supply the pressurized fluid to the fluidic tie rod fluid circuit.

10. The agricultural machine set forth in claim 8, wherein the fluid connection includes a flow restriction.

11. The agricultural machine set forth in claim 10, wherein the flow restriction is a reduced orifice restriction.

12. The agricultural machine set forth in claim 8, wherein the first state of the rear steering control valve connects fluid communication between the fluidic tie rod fluid circuit and a tank return fluid circuit, and disconnects fluid communication between a supply pressure fluid circuit and a command valve supply fluid circuit, and wherein the second state of the rear steering control valve disconnects fluid communication between the fluidic tie rod fluid circuit and the tank return fluid circuit, and connects fluid communication between the supply pressure fluid circuit and the command valve supply fluid circuit.

13. The agricultural machine set forth in claim 12, wherein the fluid connection connects fluid communication between the fluidic tie rod fluid circuit and the supply pressure fluid circuit when the rear steering control valve is positioned in the first state.

14. The agricultural machine set forth in claim 12, wherein the fluid connection connects fluid communication between the fluidic tie rod fluid circuit and the supply pressure fluid circuit when the rear steering control valve is positioned in the second state.

* * * * *